US009253430B2

(12) United States Patent  
Levine et al.

(10) Patent No.: US 9,253,430 B2  
(45) Date of Patent: Feb. 2, 2016

(54) SYSTEMS AND METHODS TO CONTROL VIEWED CONTENT

(75) Inventors: David Alberto Levine, Smyrna, GA (US); Dale Malik, Dunwoody, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 697 days.

(21) Appl. No.: 12/354,064

(22) Filed: Jan. 15, 2009

(65) Prior Publication Data

US 2010/0180297 A1 Jul. 15, 2010

(51) Int. Cl.
*G06F 3/00* (2006.01)
*G06F 13/00* (2006.01)
*H04N 5/445* (2011.01)
*H04N 5/45* (2011.01)
*H04N 21/43* (2011.01)
*H04N 21/431* (2011.01)
*H04N 21/434* (2011.01)
*H04N 21/443* (2011.01)
*H04N 21/45* (2011.01)
*H04N 21/462* (2011.01)
*H04N 21/485* (2011.01)
*G06F 3/14* (2006.01)
*G09G 5/14* (2006.01)

(52) U.S. Cl.
CPC .............. *H04N 5/45* (2013.01); *H04N 21/4307* (2013.01); *H04N 21/4312* (2013.01); *H04N 21/4314* (2013.01); *H04N 21/4347* (2013.01); *H04N 21/4438* (2013.01); *H04N 21/4532* (2013.01); *H04N 21/4622* (2013.01); *H04N 21/4858* (2013.01); *G06F 3/14* (2013.01); *G09G 5/14* (2013.01)

(58) Field of Classification Search
CPC .......... H04N 5/44543; H04N 21/4316; H04N 21/44222; H04N 21/4438; H04N 21/478; H04N 21/4781; H04N 5/45; H04N 21/00; H04N 21/4122; H04N 21/42204; H04N 21/4263; H04N 21/4314; H04N 21/4341; H04N 21/46
USPC ............................. 725/37, 87, 38–61, 80–81
See application file for complete search history.

(56) References Cited

U.S. PATENT DOCUMENTS

| | | | |
|---|---|---|---|
| 5,894,320 A | 4/1999 | Vancelette | |
| 6,128,649 A | 10/2000 | Smith | |
| 6,195,692 B1 | 2/2001 | Hsu | |
| 6,889,384 B1 | 5/2005 | Soloff | |
| 8,112,784 B1 * | 2/2012 | Jackson et al. | 725/151 |
| 2004/0032495 A1 * | 2/2004 | Ortiz | 348/157 |
| 2004/0177161 A1 * | 9/2004 | Hoang | 709/246 |
| 2005/0005308 A1 * | 1/2005 | Logan et al. | 725/135 |
| 2005/0019015 A1 * | 1/2005 | Ackley et al. | 386/95 |
| 2005/0028208 A1 * | 2/2005 | Ellis et al. | 725/58 |
| 2005/0160458 A1 * | 7/2005 | Baumgartner | 725/46 |
| 2006/0230427 A1 * | 10/2006 | Kunkel et al. | 725/133 |
| 2007/0011702 A1 | 1/2007 | Vaysman | |
| 2008/0154958 A1 * | 6/2008 | Sloo et al. | 707/104.1 |

* cited by examiner

Primary Examiner — Pankaj Kumar
Assistant Examiner — Alazar Tilahun
(74) Attorney, Agent, or Firm — Toler Law Group, PC

(57) ABSTRACT

Systems and methods to allow a user to control viewed content. A particular method includes receiving at least one selected video stream of multiple video streams associated with a particular event. The method includes forming an output stream from the at least one selected video stream based on a user modifiable template. The method also includes sending the output stream to a display device for playback as indicated by the user modifiable template. The user modifiable template indicates a display region location where the at least one selected video stream is to be displayed.

25 Claims, 9 Drawing Sheets

SYSTEMS AND METHODS TO CONTROL VIEWED CONTENT

FIELD OF THE DISCLOSURE

The present disclosure is generally related to systems and methods to customize viewed content.

BACKGROUND

Television viewers typically have little control of the content of televised programs. A television program is transmitted to viewers in a contained fashion. For example, information related to a televised program (video, one or more audio streams, and one or more data streams such as close captioning) may be sent simultaneously for an analog transmission or in simultaneous, quasi-synchronized streams for digital transmission.

Several cameras may be used during coverage of a live event, such as a sporting event. Feeds from the cameras may be mixed in a control booth to generate the televised program sent to viewers. Viewers typically do not have control of the content of the televised program of the live event.

DETAILED DESCRIPTION

Figure 1:
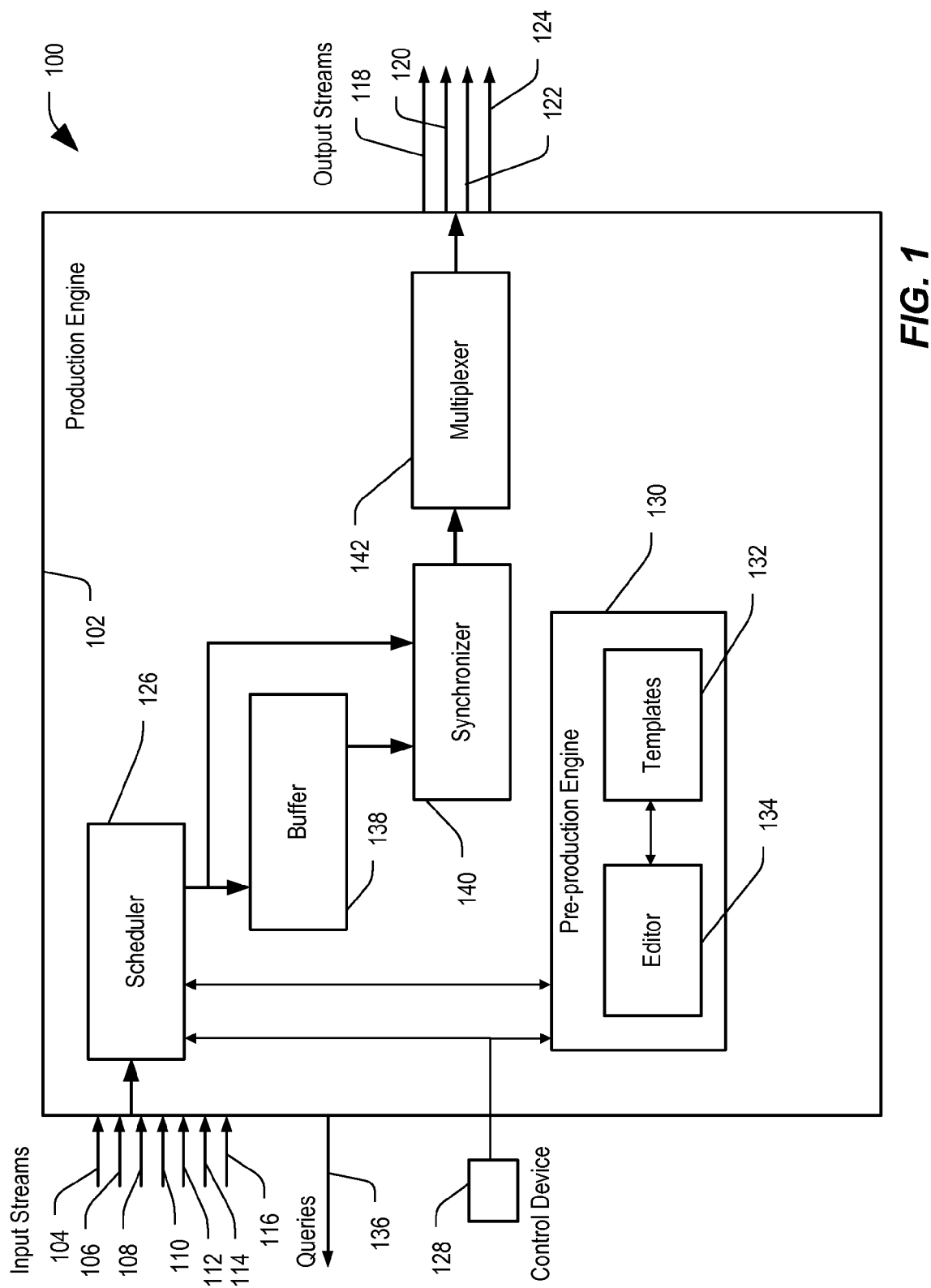
FIG. 1 is a block diagram of a first particular embodiment of a system to control viewed content.

Systems and methods to enable control of viewed content are provided. A particular method includes receiving at least one selected video stream. The at least one selected video stream is selected from multiple video streams associated with a particular event. The method also includes forming an output stream from the at least one selected video stream based on a user modifiable template. The method further includes sending the output stream to a display device for playback as indicated by the user modifiable template, where the user modifiable template indicates a display region location of the display device where the at least one selected video stream is to be displayed.

Another particular method includes receiving first input specifying a first display location of a first output stream associated with a particular event. The method also includes receiving second input specifying a second display location of a second output stream associated with the particular event. The method further includes storing information specifying the first display location and the second display location in a template. The template is useable by a scheduler to receive at least one media stream of multiple media streams associated with the particular event. The template is also useable to generate the first output stream for display on a first display device and to generate the second output stream for display on a second display device.

A particular system includes a scheduler to request a video stream of a plurality of video streams associated with a particular event. The system also includes a network interface to receive the requested video stream. The system further includes an output interface to generate an output stream to be sent to a display device. A user modifiable template indicates a display region location at the display device where the requested video stream is to be displayed.

In a particular embodiment, a computer-readable storage medium includes operational instructions that, when executed by a processor, cause the processor to receive multiple video streams. The computer-readable storage medium also includes operational instructions that, when executed by the processor, cause the processor to select a video stream of the multiple video streams. The computer-readable storage medium further includes operational instructions that, when executed by the processor, cause the processor to generate an output stream to be displayed on a display device. A user modifiable template indicates a display region location at the display device where the selected video stream is to be displayed.

Media content of a particular event may be partitioned into different input media streams. The input media streams may include video streams of the particular event (for example, video streams taken from different vantage points, available replays, live or recorded interviews, or other video content related to the particular event), one or more audio streams associated with the particular event, one or more streams containing close captioned dialogue or subtitles, one or more data streams related to the particular event, other media streams related to the particular event, or combinations thereof. The media streams for the particular event may be provided by different content providers.

When various input media streams are available for the particular event, templates may be used to organize selected content to create a coherent viewing experience. A template may be used to control what content is shown and heard, where the content is to be displayed, and when selected content is to be displayed. The template may include information that causes selected video streams of the particular event to be displayed on one or more display devices. Each display device may include one or more displays. Each display may show a video stream. The template organizes the output of the particular event as experienced by one or more viewers. The template may include information regarding which video streams are to be shown, where the video streams are to be shown, at what size the video streams are to be shown, and when certain video streams are to be shown.

The input media streams may include one or more video streams. The video streams may include multiple synchronized streams that show different angles of the same event. The video streams may include one or more asynchronous streams that include supplemental content associated with the particular event. For example, the asynchronous streams may include replays, interviews, special interest stories or other video clips related to the particular event. The template used to organize the output of the particular event may cause one or more asynchronous streams to be present on the display devices at a particular time. The asynchronous streams may be shown as separate displays on one or more display devices, or the asynchronous streams may be shown as a picture-in-picture display on one or more other displays.

The template may also cause generation of controls that enable user control of one or more of the displays. For example, the template may cause generation of controls in a display that allow one display to be swapped with another display. For a display device that includes multiple displays, the template may cause the generation of controls that toggle a selected display from a small display to a full screen display and back to the small display on demand. The template may cause generation of a picture-in-picture display that shows a portion of media content (e.g., a replay of the last play for a sporting event) upon the occurrence of one or more conditions related to the particular event. The template may also cause other changes to the display device or display devices.

The audio streams may include multiple streams that are synchronized to one or more video streams and audio streams that are not synchronized to any of the video streams (for example, one of the audio signals may be a radio feed that describes the particular event). The audio streams may include audio streams of the particular event in two or more different languages, audio streams from different commentators, and audio streams from different locations. In a particular embodiment, a user may choose to combine two or more audio streams. For example, if the particular event is a football game, commentary from a favorite commentator may be combined with ambient stadium noise). The template used to facilitate presentation of the particular event may include information regarding which audio streams are to be used and which video streams to associate with the audio streams. The template may also control which display or displays of one or more display devices have an audio stream.

The template may control where data (e.g., video visual information) is presented. For example, the template may control where or when close caption data is presented. The data may be presented as a separate display on a display device, or as an overlay of another display. The template may create graphical interfaces that facilitate presentation of certain types of data. For example, the template may include instructions that generate a graphical representation (e.g., a scoreboard representation) that displays data from a data stream when the particular event is a sporting event. The graphical representation may be shown as a separate display or as an overlay of another display.

In an illustrative embodiment, the particular event is a sporting event. The user has two display devices for viewing the sporting event. The first display device is a television, and the second display device is a monitor coupled to a computer. Through the use of a template, the user designates that a particular view of the sporting event is to be shown on the television without any extraneous data. Through the use of the template, the user also designates that a representation of the stadium scoreboard is to be shown on the monitor. The monitor may also show information about the players, replays, trivia, other scores, and other information associated with the sporting event. The display on the monitor could include controls that allow replays or other information to be displayed on the television screen.

The ability to provide user customized viewing of a particular event is not limited to sporting events. For example, when the particular event is a movie, a second display could show actor information, trivia, another scene angle (if available), director and/or actor commentary, or other information. When the particular event is a contest show, a second display could show trivia, contestant statistics, contestant biography, voting options (if applicable), or other information.

Referring to FIG. 1, a first particular embodiment of a system to control viewed content is presented and designated as 100. The system 100 includes a production engine 102 that receives at least one media stream, such as input media streams 104-116 and outputs at least one output stream, such as output streams 118-124. The output streams 118-124 may be adapted to be played back on different types of display devices to provide a user with a customized viewing experience. For example, a first output stream 118 and a second output stream 120 may be adapted for display on a television, a third output stream 122 may be adapted for display on a computer monitor, and a fourth output stream 124 may be adapted for display on a screen of a mobile device.

The production engine 102 may include a scheduler 126. The scheduler 126 may receive an electronic program guide or other scheduling data. A user may select a particular event to be viewed or other options from the scheduler 126 using a control device 128. The control device 128 may be a remote control, touch screen, computer or other type of control device. The particular event may include a sports event, a movie, a game show or another televised offering.

When a user selects the particular event to be viewed, the scheduler 126 determines whether the particular event has multiple input streams that allow the user to choose how the particular event will be viewed. When the particular event has multiple input streams, the scheduler 126 offers user control of the viewing experience, by offering the user the option of viewing the particular event traditionally (e.g., as a single display with an audio stream) or of viewing the particular event in a customizable manner. When the user chooses to view the particular event traditionally, the production engine 102 provides a traditional output stream.

When the user chooses to view the particular event in a customizable manner, the scheduler 126 calls on a pre-production engine 130. The scheduler 126 may forward a list of available input streams associated with the particular event to the pre-production engine 130. The pre-production engine 130 may include templates 132, and an editor 134 for modifying the templates 132.

A template 132 is used by the production engine 102 to determine the content and display location region of the output streams 118-124 and when selected content is to be displayed. The pre-production engine 130 may include a number of templates 132 for various types of events. The templates 132 may be divided into categories. For example, specific templates 132 may be provided for movies, game shows, contest shows, sports events, etc. Each category may have one or more templates 132 or one or more sub-categories. The sub-categories may contain one or more sub-categories or templates 132. For example, the movies category may have domestic and foreign sub-categories. One or more templates 132 may be in each of the sub-categories. For example, the foreign movie sub-category may include a template 132 that provides options for placement of subtitles for the movie so that the movie and the subtitles do not overlap. The sports category may have sub-categories for various types of sports (e.g., baseball, soccer, football, basketball, golf, auto racing, etc.). The templates 132 for a particular category or sub-category may provide a layout for viewing the type of event. The editor 134 may be used to modify a template 132 to the preferences of a user.

The templates 132 may include a number of template blanks and/or a number of user-defined templates. The template blanks are starter templates. When a template blank is chosen, the editor 134 may be used to modify the template blank. The changes to template blanks may be saved as a user-defined template. When a user-defined template is chosen, the editor 134 may be used to change one or more options of the user-defined template. The changes to the user-defined template may be saved as the same user-defined template or as a new user-defined template.

A user-defined template may be downloadable from the pre-production engine 130 to a computer-readable storage medium. One or more downloaded user-defined templates may be uploaded to a different pre-production engine so that the user can view a selected event as desired on a different system (e.g., at a different location than where the template was created) with no or minimal template editing.

Certain user-defined templates may be given to others or sold to others. Such user-defined templates may include content that is specific to a certain event type, a certain team, a certain venue, etc. Free or purchasable user-defined templates may be available from e-commerce stores for downloading or may be available on computer-readable storage media. A person or company who gives away or sells user-defined templates may incorporate advertising in the user-defined template. A person who has received or bought a user-defined template may upload the user-defined template to the pre-production engine 130. The use of a received or purchased user-defined template may allow a person to view a selected event with no or minimal template editing.

The pre-production engine 130 may cause a display device to show a list of available templates 132 that can be used for viewing the particular event. The list of available templates may be selected based on metadata included in the information received from the scheduler 126. The list may include a general template blank to handle cases where the particular event does not fit in a category or sub-category or where the user does not want to use a template associated with the particular event type. The user may use the control device 128 (e.g., a remote control) to select a desired template 132.

A selected template may be sent to the editor 134. The editor 134 may show a list of display devices that can be used for playback of the particular event. The editor 134 may allow additional display devices to be added to the list. The user may select one or more display devices for playback of the particular event.

The editor 134 provides a list of input media associated with the particular event (e.g., the input streams 104-116). In a particular embodiment, the scheduler 126 identifies the input media. In a particular embodiment, the editor 134 searches for available input media based on the identification of the particular event. The editor 134 may also allow additional input media streams to be added to the list. For example, when the particular event is a sporting event, the user may add a media stream that includes data pertaining to particular players. The user may specify a radio channel, internet web site, or other source for obtaining the data. The user may select one or more of the input media streams from the list of input media streams for playback.

When a particular video stream of the input media streams is selected, the user selects which display device to show the selected video stream on. The editor 134 may include an organizer that displays a representation of the selected display device. The user may then interact with the organizer to define a display region location where the selected video stream is to be shown on the selected display device using input from the control device 128. One or more selected video streams may overlay another video stream. When the position of the selected video stream is where the user desires, identifiers that describe the display device and the display region location are added to the template 132.

The user may select one or more audio streams of the input media streams to be used. The editor 134 may allow a selected audio stream to be associated with a selected video stream. The audio stream associated with a video stream may not be the typical audio stream associated with the video stream. For example, in a traditional view of a sporting event, an audio stream that contains the comments of one or more commentators is associated with the video stream showing the sporting event. Instead of selecting the typical audio stream, a user may elect to choose an audio stream that includes audio from inside a stadium or other location of the sporting event.

The user may use the template 132 to associate an audio stream with one or more video streams. For example, a user may associate a first audio stream obtained from a radio broadcast of the particular event with a first video stream taken from a first viewing angle. The first video stream may be shown as a first display on a first display device. The first audio stream may also be associated with a second video stream taken from a second viewing angle. The second video stream may be shown as a first display on a second display device.

The user may use the template 132 to define which displays will have an active audio stream. For example, a first video stream may be shown as the first display of a first display device. A first audio stream may be associated with a first video stream and may be played when the first video stream is shown. A second video stream may be shown as a second display on the first display device. A second audio stream may be associated with the second video stream and may be inactive (i.e., does not play) when the second display is shown on the first display device. When the first display is switched with the second display, the second audio stream will become active and the first audio stream will be inactive.

The template 132 may enable control of when one or more of the input streams 104-116 are presented. For example, one of the input media streams may include a data stream. The template 132 may include identifiers for data of the data stream to be presented when one or more conditions are satisfied. The data and conditions may be evaluated by the production engine 102 to determine when one or more of the selected video streams and/or audio streams are to be provided in the output streams 118-124. For example, the data stream may include a position of the ball during a football game. The template 132 may indicate that the production engine 102 is to add a replay video stream showing a replay of the last play when the ball crosses the 20-yard line toward one of the end zones.

The template 132 may include a graphical user interface that the production engine 102 includes in one of the output streams 118-124. The graphical user interface may be a limited function editor for the template that provides control options to quickly change the setup of the output of the particular event. For example, in an embodiment where the particular event is a baseball game, the production engine 102 may send the first output stream 118 to a first television and the second output stream 120 to a second television. The first television may show a first display of the baseball game from a first vantage point above a home team dugout, and a second display of a representation of a scoreboard. The second television may show a first display of the traditional television feed for the baseball game, a second display from a vantage point above a visiting team dugout, and a third display that includes the graphical user interface. The graphical user interface may provide a user-selectable control option for swapping the first display on the first television with the first display or the second display on the second television.

The graphical user interface may also include a user-selectable control option to specify which audio stream is active. The control device 128 may be used to select control options of the graphical user interface. Use of the graphical user interfaces results in changes to the template 132 used to control the output streams 118-124 from the production engine 102. In a particular embodiment, changes made to the template 132 using the graphical user interface are not saved in the template 132 in the pre-production engine 130. In another particular embodiment, changes made to the template 132 using the graphical user interface are automatically saved in the template 132 in the pre-production engine 130.

In a particular embodiment, the template 132 may include instructions that cause the production engine 102 to swap a first display selected using the control device 128 with a second display selected using the control device 128.

In a particular embodiment, the production engine 102 includes a buffer 138. The buffer 138 may store a portion of media content associated with one or more of the input media streams 104-116, or one or more of the output streams 118-124. The buffered portion may be used to provide a replay of a portion of the media content. For example, the replay may be presented in response to a triggering event or in response to user selection of a replay control option of the graphical user interface.

Templates 132 for selected types of events may allow for the display of advertising content during playback of the particular event. For example, when the particular event is a sporting event and when one of the input media streams 104-116 is a data stream that includes data regarding remaining time, score, ball position, team in possession of the ball, etc., the template 132 may include instructions executable by the production engine 102 for generating a graphic display showing the information in the data stream. For example, the graphic display may take the form of a scoreboard. The graphic display may include advertising content. For example, a scoreboard graphic display may include a company logo or other content.

After the template 132 is selected, the pre-production engine 130 provides the template 132 to the scheduler 126. The scheduler 126 sends one or more queries 136 to obtain the selected input media streams 104-116 specified by the template 132. The input media streams 104-116 may include different types of streams. For example, a first input media stream 104 and a second input media stream 106 may be video streams that show the particular event from different vantage points, a third input media stream 108 and a fourth input media stream 110 may be audio streams related to the particular event, a fifth input media stream 112 may be a text stream (e.g., a close caption stream), a sixth input media stream 114 may be a data stream (e.g., a stream that includes data for a scoreboard of a sporting event), and a seventh input media stream 116 may be an asynchronous stream (e.g., a non-real time video stream showing replays of certain plays of the sporting event forwarded from a content provider). In other embodiments, the production engine 102 receives fewer or more input media streams than the seven input media streams 104-116 illustrated in FIG. 1.

The scheduler 126 sends the selected input media streams 104-116 to the buffer 138 or to a synchronizer 140. One or more of the selected input media streams 104-116 are sent to the buffer 138 when the template 132 indicates that the selected streams are to be buffered to allow for the option of user defined replays of portions of the selected streams. Output streams from the buffer 138 pass to the synchronizer 140.

The synchronizer 140 receives the input media streams 104-116 from the scheduler 126 and the output streams from the buffer 138. The synchronizer 140 reads the template 132 and synchronizes a selected audio stream or audio streams identified as active in the template 132 with associated video streams. The synchronizer 140 may also synch multiple video streams. The media streams are sent from the synchronizer 140 to a multiplexer 142.

The multiplexer 142 reads the template 132 and creates the output streams 118-124. The multiplexer 142 combines media content of the input media streams 104-116 into the output streams 118-124 for different media and/or for different display devices based on the template 132.

Figure 2:
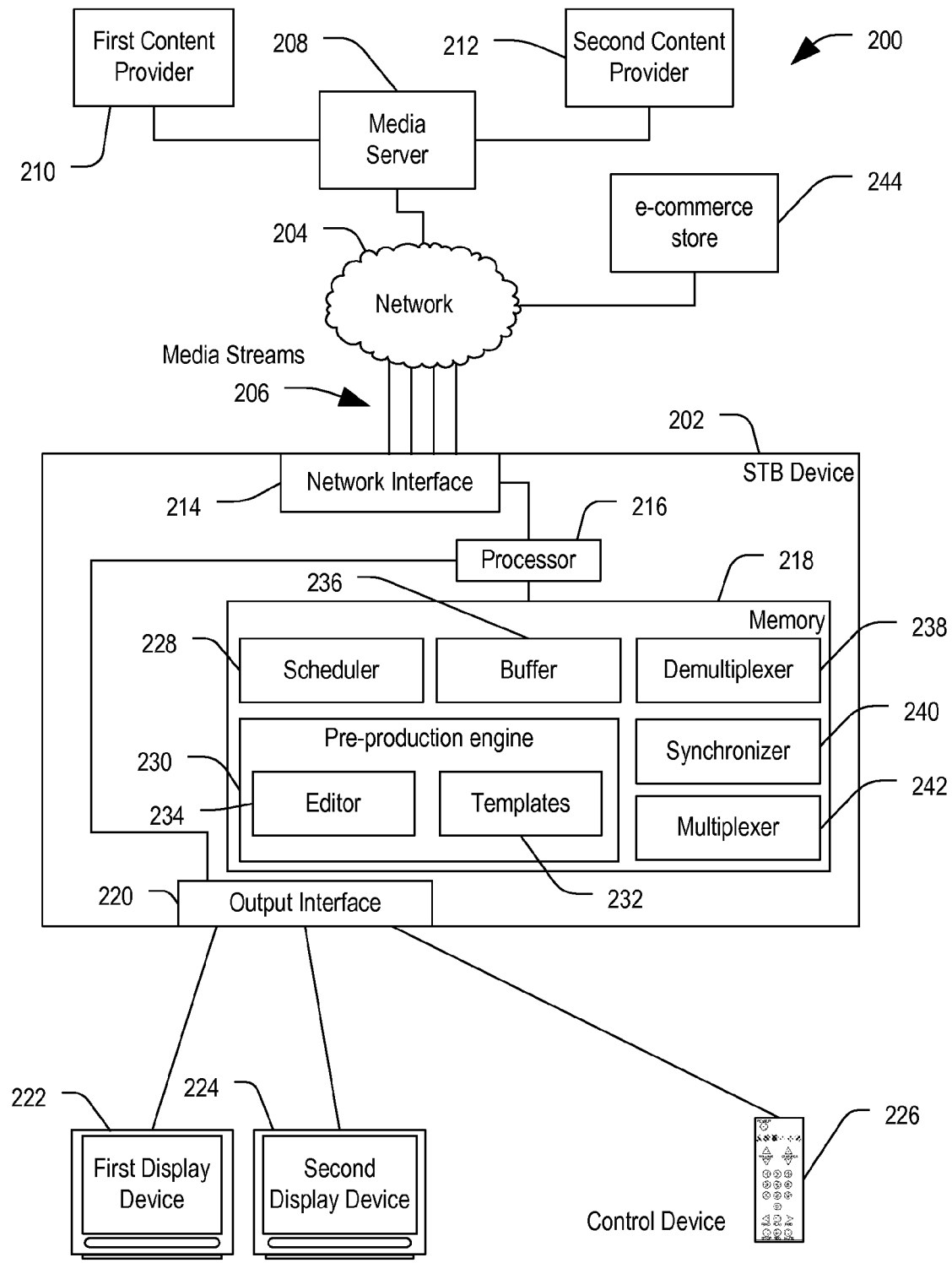
FIG. 2 is a block diagram of a second particular embodiment of a system to control viewed content.

FIG. 2 illustrates a second particular embodiment of a system to control viewed content, designated 200. The system 200 includes a set-top box (STB) device 202 coupled to a network 204 to receive media streams 206. For example, the STB device 202 may receive the media streams 206 from a media server 208. The media server 208 may receive the media streams 206 from one or more content providers, such as a first content provider 210 and a second content provider 212. The media streams 206 may include, but are not limited to, video streams, audio streams, text streams, data streams, web content, or combinations thereof.

The content providers 210, 212 and/or the media server 208 may include servers, routers, switches, other network devices, or any combination thereof, to provide the media content to the STB device 202. In a particular embodiment, the media server 208 and the network 204 are part of an interactive television system, such as an Internet Protocol Television (IPTV) system. In another particular embodiment, the media server 208 and the network 204 together are part of a cable television system.

The STB device 202 may be coupled to the network 204 via a network interface 214. The network interface 214 may receive data from the network 204 and send data to the network 204. The received data includes the media streams 206. The STB device 202 may also include a processor 216, and a memory 218 coupled to the processor 216. The STB device 202 may be coupled via an output interface 220 to one or more output devices, such as a first display device 222 and a second display device 224. Additionally, the STB device 202 may receive control input via the output interface 220. For example, the STB device 202 may receive control input from a remote control device 226.

In a particular embodiment, the memory 218 includes a scheduler 228 that determines whether user modifiable templates are to be used to customize the output for a particular event. If the output is to be customized, information regarding the event is sent to a pre-production engine 230. The processor 216 executes the pre-production engine 230 to generate a list of templates that may be used to organize the output for the particular event from templates 232 stored in the memory 218. The templates in the list of templates may be a subset of the templates 232. The templates 232 may include blank templates related to certain types of events (for example, football games, tennis games, game shows, contest shows, etc.) and/or user-defined templates. User-defined templates are templates that were previously set up by a user to control the way a particular type of event is displayed. The list of templates may be generated based on the type of the particular event.

The user selects a template from the list of templates. The processor 216 may implement an editor 234 to modify the selected template. The editor 234 may enable the user to choose which display devices 222, 224 are to be used, select the media streams 206 to be used, determine where content is to be displayed on each of the display devices 222, 224, and/or determine when certain content is to be displayed. When the user is finished editing the selected template, the selected template is saved with the templates 232.

The selected template may be used by the processor 216 to generate output streams that are sent to the display devices 222, 224 to result in a viewing experience customized by the user. The processor 216 requests and the STB device 202 receives the selected input media streams 206 identified in the selected template. The selected template may identify one or more of the input media streams 206 and/or output streams as buffer streams. The buffer streams include portions of media content that may be replayed if certain conditions are met. The processor 216 uses a buffer 236 to buffer the buffer streams and uses portions of the buffer streams when the conditions for replay of a portion of a buffered stream are met. The conditions for replaying a portion of the buffer stream may be specified in the selected template.

The processor 216 uses a demultiplexer 238 to separate portions of the input media streams 206 when the input media streams 206 include portions that are to be presented by different display devices 222, 224. The selected template may indicate which input media streams 206 are to be separated. One or more of the input media streams 206 may be a multiplexed stream. The demultiplexer 238 may be used to separate the multiplexed stream into two or more component streams when only a portion of the multiplexed stream is to be used or when the components of the multiplexed stream are to be used at different locations. For example, one of the input media streams 206 may be a traditional feed of a sporting event that includes both video and audio. The selected template may place the video stream of the traditional feed as the first display of the first display device 222 and may associate an audio stream with the first display. The demultiplexer 238 may be used to separate the multiplexed media stream so that the traditional video stream can be associated with the other audio stream.

The processor 216 uses a synchronizer 240 to associate one or more selected audio streams with one or more selected video streams based on information contained in the selected template. The processor 216 uses a multiplexer 242 to produce one or more output streams to be sent to the first display device 222 and the second display device 224. For example, the multiplexer 242 may combine two video streams to make an output stream that includes two displays at different locations of the first display device 222.

In a particular embodiment, one or more templates 232 may be obtained from an e-commerce store 244. Some templates 232 may be obtained from the e-commerce store 244 for free. Some free user-defined templates may include advertising. Some templates 232 may be purchased from the e-commerce store 244. Free or purchased templates may be downloaded from the e-commerce store 244 to the templates 232 in pre-production engine 230 through the network 204.

Figure 3:
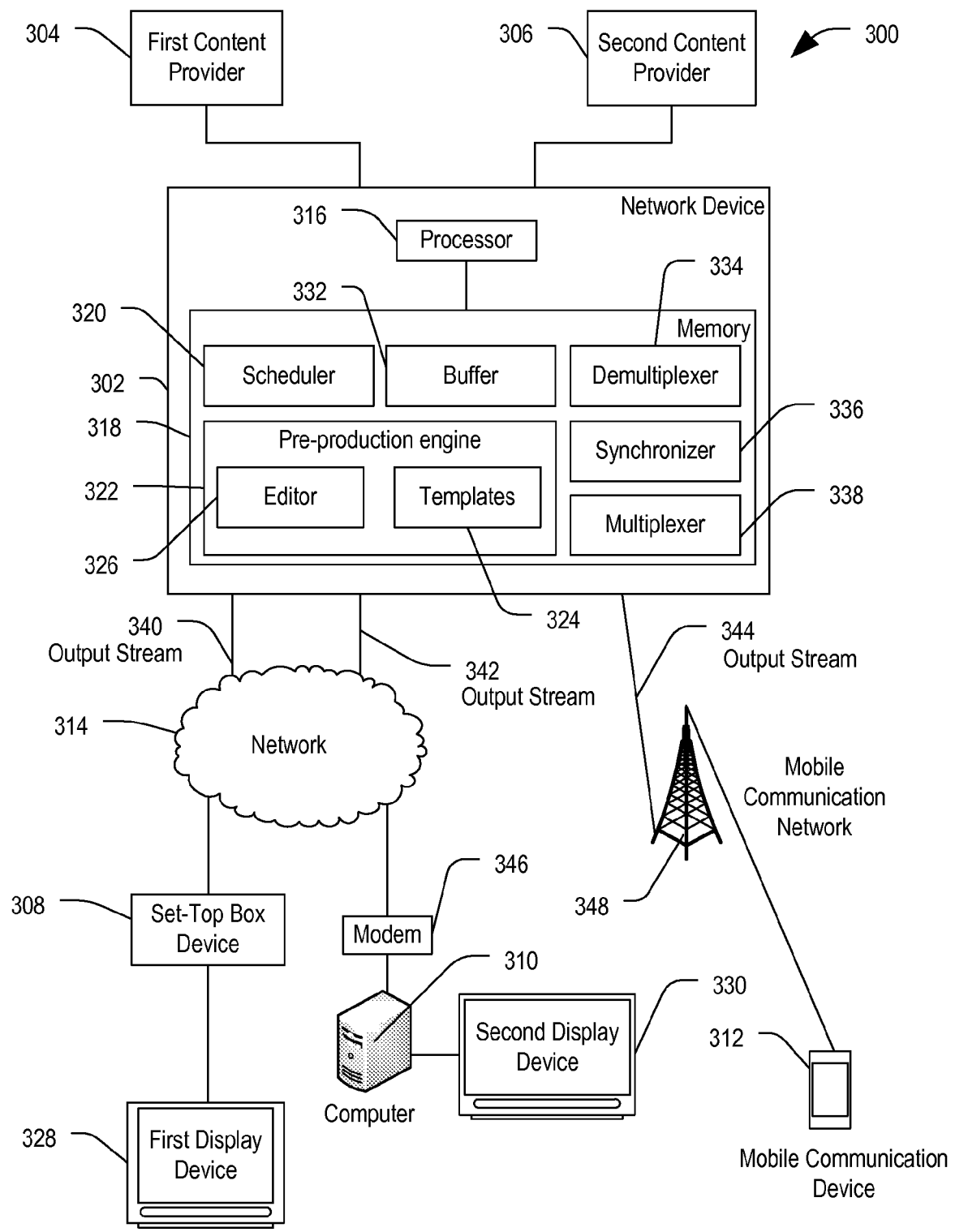
FIG. 3 is a block diagram of a third particular embodiment of a system to control viewed content.

FIG. 3 illustrates a third particular embodiment of a system to control viewed content, designated 300. The system 300 includes a network device 302 that sends output streams to one or more display devices using various protocols to enable a user-defined viewing experience of a particular event. The network device 302 may receive input media streams from one or more content providers, such as a first content provider 304 and a second content provider 306. The input media streams may include, but are not limited to, video streams, audio streams, text streams, data streams, web content, or combinations thereof.

The content providers 304, 306 may include servers, routers, switches, other network devices, or any combination thereof, to provide media content to a STB devices (such as STB device 308), computers (such as a computer 310), mobile devices (such as a mobile device 312), and/or other output devices. In a particular embodiment, the network device 302 and the network 314 are part of an interactive television system, such as an Internet Protocol Television (IPTV) system. In another particular embodiment, the network device 302 and the network 314 together are part of a cable television system.

The network device 302 may include a processor 316 and a memory 318 accessible to the processor 316. The memory 318 includes a scheduler 320 that determines whether user modifiable templates are to be used to control the output experienced by viewers. If the user modifiable templates are to be used, information regarding the event is sent to a pre-production engine 322. The processor 316 executes the pre-production engine 322 to generate a list of templates that may be used to organize the output for the particular event from templates 324 stored in the memory 318. The templates in the list of templates may be a subset of the templates 324. The templates 324 may include blank templates related to certain types of events (for example, football games, tennis games, game shows, contest shows, etc.) and/or user-defined templates. User-defined templates are templates that were previously set up by a user to control the way a particular type of event is displayed. The list of templates may be generated based on the type of the particular event.

The user selects a template from the list of templates. The processor 316 may implement an editor 326 to modify the selected template. The editor 326 may enable the user to choose which display devices 312, 328, 330 are to be used, select the media streams to be used, determine where content is to be displayed on each of the display devices 312, 328, 330, and/or determine when certain content is to be displayed. When the user is finished editing the selected template, the selected template is saved with the templates 324.

The selected template may be used by the processor 316 to generate output streams that are sent to the display devices 312, 328, 330 to result in the viewing experience customized by the user. The processor 316 requests and the network device 302 receives selected input media streams identified in the selected template. The selected template may identify one or more input media streams and/or one or more of the output streams 340-344 as buffer streams. The buffer streams include portions of media content that may be replayed if certain conditions are met. The processor 316 uses a buffer 332 to buffer the buffer streams and use portions of the buffer streams when the conditions for replay of a portion of a buffered stream are met. The conditions for replaying a portion of the buffer stream may be specified in the selected template.

The processor 316 uses a demultiplexer 334 to separate portions of the input media streams when the input media streams include portions that are to be presented by the different display devices 312, 328, 330. The selected template may indicate which input media streams are to be separated. One or more of the input media streams may be a multiplexed stream. The demultiplexer 334 may be used to separate the multiplexed stream into two or more component streams, when only a portion of the multiplexed stream is to be used or when the components of the multiplexed stream are to be used at different locations. For example, one of the input media streams may be a traditional feed of a sporting event that includes both video and audio. The selected template may place the video stream of the traditional feed as the first display of the first display device 328 and may associate an audio stream with the first display. The demultiplexer 334 may be used to separate the multiplexed media stream so that the traditional video stream can be associated with the other audio stream.

The processor 316 uses a synchronizer 336 to associate one or more selected audio streams with one or more selected video streams based on information contained in the selected template. The processor 316 uses multiplexer 338 to produce one or more output streams 340, 342, 344 to be sent to the display devices 312, 328, 330. For example, the multiplexer 338 may combine two video streams to make the output stream 342 that includes two displays at different locations of the second display device 330.

The output streams 340, 342, 344 produced by the network device 302 may be formed using different protocols. For example, in the embodiment depicted in FIG. 3, the output stream 340 is sent using a video protocol. The output stream 340 is sent to the display device 328 through the network 314 and a set-top box device 308. In a particular embodiment, the output stream 340 is sent using a multicast protocol. The output stream 342 is sent using an internet protocol. The output stream 342 is sent to the display device 330 of a computer 310 through the network 314 and a modem 346. In a particular embodiment, the output stream 342 is sent using a unicast protocol. The output stream 344 is sent from the network device 302 to a mobile communication network 348 and to a mobile communication device 312. In a particular embodiment, the output stream 344 is sent using a mobile telephony protocol.

Figure 4:
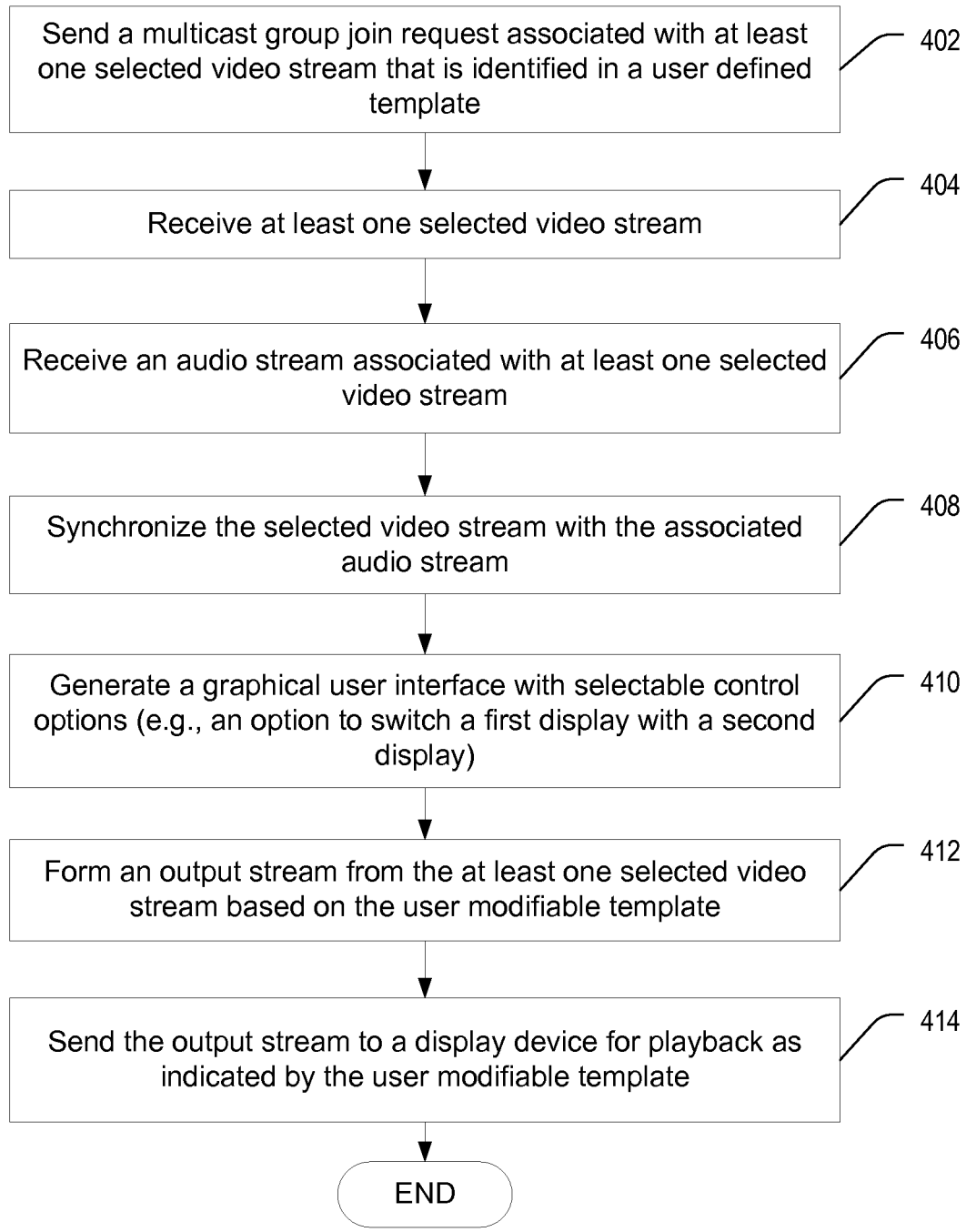
FIG. 4 is a flow chart of a first particular embodiment of a method to control viewed content.

Referring to FIG. 4, a first particular embodiment of a method to control viewed content is illustrated. The method includes, at 402, sending at least one multicast group join request associated with at least one selected video stream that is indentified in a user defined template. At 404, the at least one selected video stream is received. At 406, an audio stream associated with the at least one selected video stream is received. At 408, the selected video stream is synchronized with the associated audio stream.

The method also includes, at 410, generating a graphical user interface with selectable control options. For example, the control options may include an option to switch a first display with a second display.

At 412, the method includes forming an output stream from the at least one selected video stream based on the user modifiable template. At 414, the method includes sending the output stream to a display device for playback as indicated by the user modifiable template.

Figure 5:
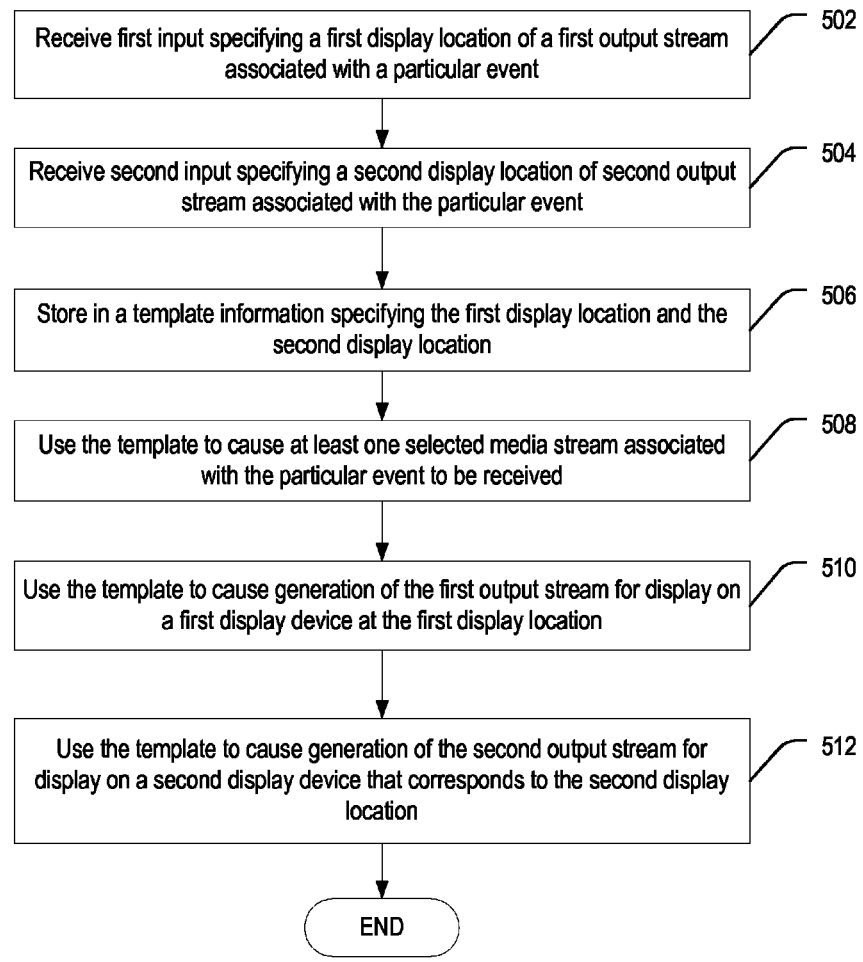
FIG. 5 is a flow chart of a second particular embodiment of a method to control viewed content.

Referring to FIG. 5, a second particular embodiment of a method to control viewed content is illustrated. The method includes, at 502, receiving first input user specifying a first display location of a first output stream associated with a particular event. The method includes, at 504, receiving second input specifying a second display location of a second output stream associated with the particular event. The first input and the second input may be provided by a single person or by more than one person. The first input and/or the second input may be provided by using a remote control, a computer, a touch screen, or another control device. The method further includes, at 506, storing in a template information specifying the first display location and the second display location.

The method further includes, at 508, using the template to cause at least one selected media stream associated with the particular event to be received. The method includes, at 510, using the template to cause generation of the first output stream for display on a first display device at the first display location; and, at 512, using the template to cause generation of the second output stream for display on a second display device at the second display location.

Figure 6:
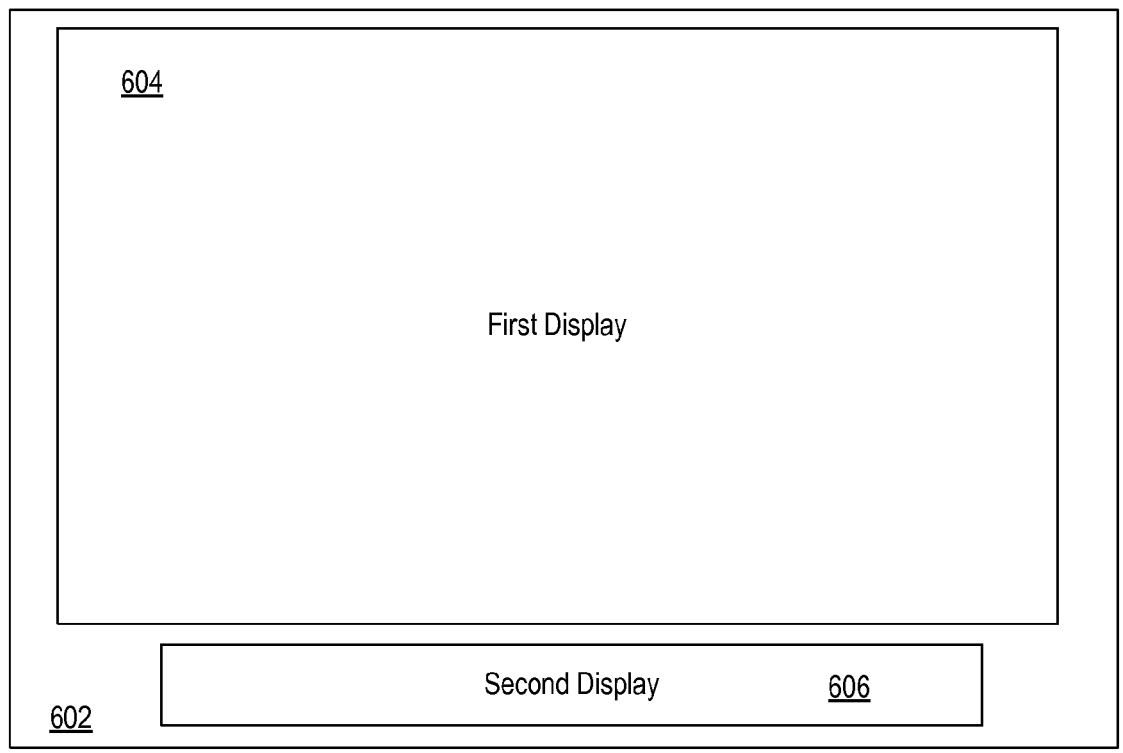
FIG. 6 is an illustration of an embodiment of a first display device used to view controlled content.

A selected template may cause the generation of one or more output streams that may be displayed on one or more display devices. FIG. 6 illustrates an embodiment of a first display device 602 used to view controlled content. The selected template causes the output to be displayed on a first display 604 and a second display 606. For example, a display configuration as illustrated in FIG. 6 may be used to view a foreign movie. The video of the movie may be shown in the first display 604. An audio stream may be associated with the video stream shown in the first display 604. Subtitles of the dialogue of the movie may be displayed in the second display 606. A viewer may find that locating the subtitles below the movie is less distracting than having the subtitles in the viewing area of the movie (i.e., in the first display 604). Alternately, the selected template could be modified to display the location of the subtitles at a different location, for example at the top of the first display device 602, or overlaying a portion of the first display 604.

Figure 7:
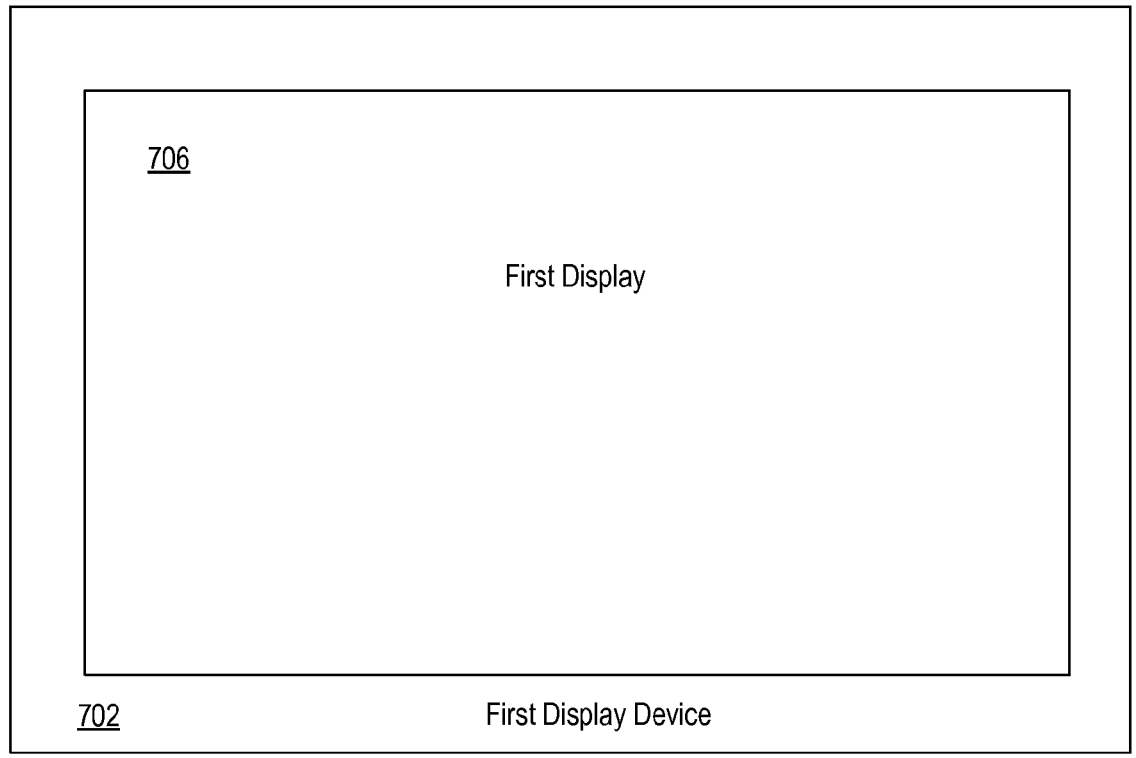
FIG. 7 is an illustration of an embodiment of a first display device and a second display device used to view controlled content.
Figure 7:
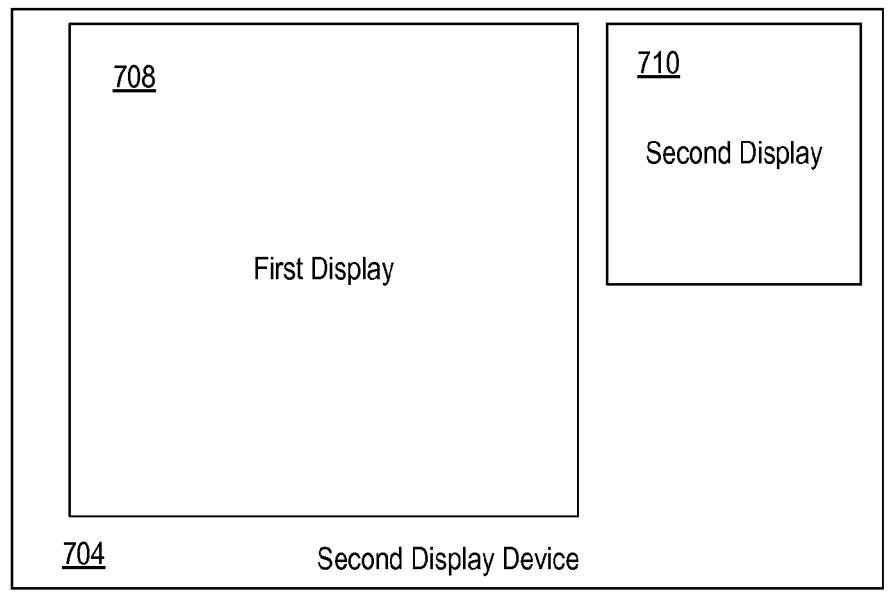

FIG. 7 depicts an embodiment where the selected template directs a first output stream to a first display device 702 and a second output stream to a second display device 704. The first display device 702 may present a first display 706 that shows a particular event from a first angle. The second display device 704 may present a first display 708 that depicts a graphic representation of a scoreboard that displays data pertaining to the particular event. The graphic representation of the scoreboard may include advertising content. The second display device 704 may also present a second display 710. The second display 710 may show a replay of a portion of the video presented on the first display 706 of the first display device 702 when one or more conditions are met.

Figure 8:
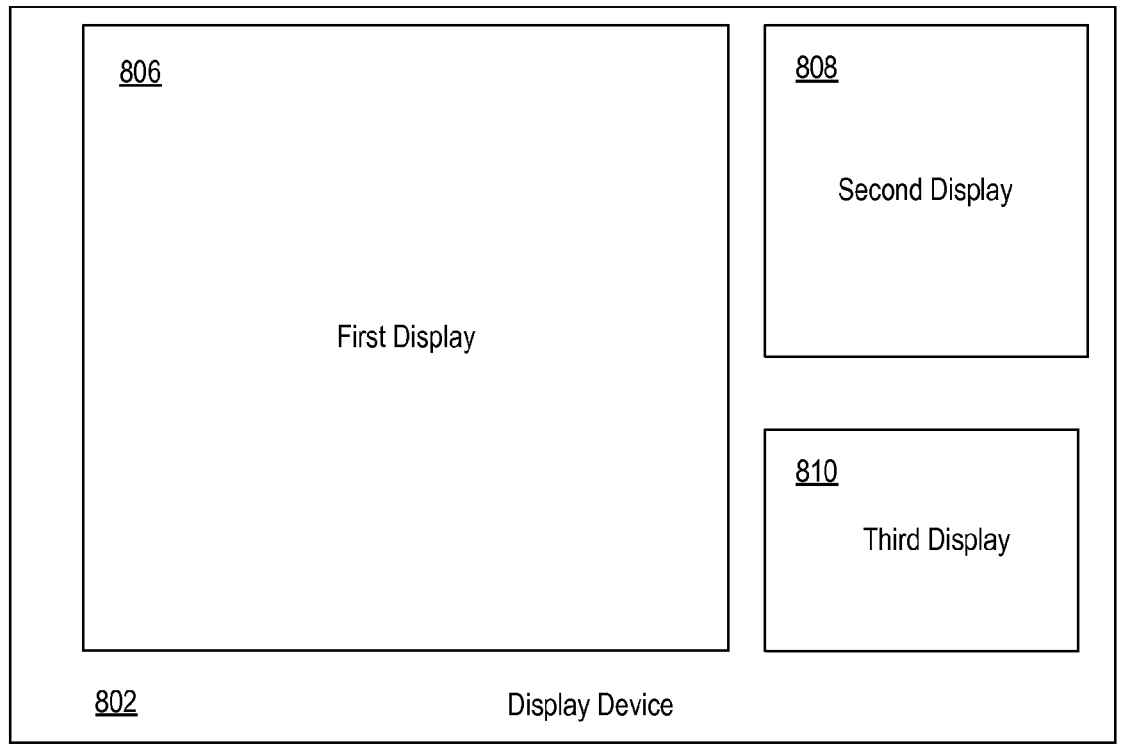
FIG. 8 is an illustration of an embodiment of a first display device and a mobile device used to view controlled content.
Figure 8:
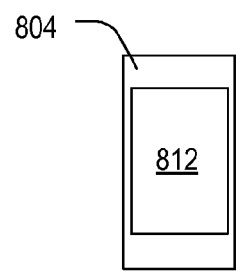

FIG. 8 depicts an embodiment where the selected template directs a first output stream to a display device 802 and directs a second output stream to a mobile device 804. A first display 806 of the display device 802 may show the particular event from a first vantage point, for example, from a vantage point located at about a 50-yard line position on a first side of a football field. A second display 808 may show the particular event from a second vantage point, for example, from a vantage point of a mobile camera that is moved to a location adjacent to a position of the football before a play begins. A third display 810 may show a graphical representation of data pertaining to the game (for example, current quarter, time remaining, ball position, team in possession, etc.).

The second output stream sent to the mobile device 804 may be displayed on a mobile device display 812. In an embodiment, asynchronous video streams are sent to the mobile device 804. The asynchronous video streams may be player or coach interviews, or other video streams that are sent when the streams become available. An indicator in the third display 810 of the first display device 802 may inform a viewer when a stream is being sent to the mobile device 804.

Figure 9:
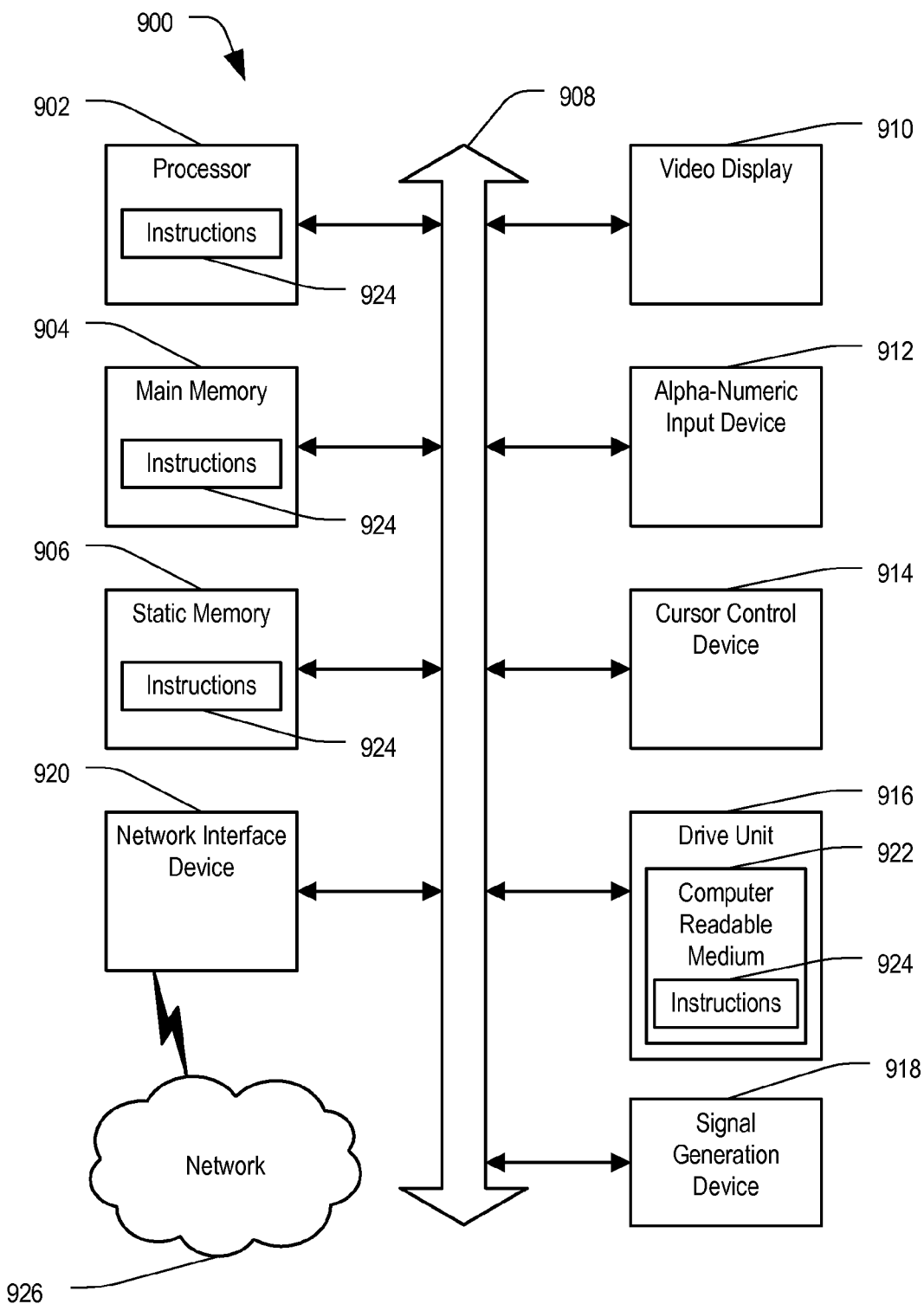
FIG. 9 is a block diagram of a general computer system.

Referring to FIG. 9, an illustrative embodiment of a general computer system is shown and is designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices. The computer system may include or be included within one or more of the production engine 102, control device 128, set-top box device 202, the media server 208, the first display device 222, the second display device 224, the remote control device 226, the network device 302, the set-top box device 308, the first display device 328, the modem 346, the computer 310, the second display device 330, and the mobile device 312 discussed with reference to FIGS. 1-3

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. Moreover, the computer system 900 can include a main memory 904 and a static memory 906 that can communicate with each other via a bus 908. As shown, the computer system 900 may further include a video display unit 910, such as a liquid crystal display (LCD), an organic light emitting diode (OLED), a flat panel display, a solid state display, or a projection system. Additionally, the computer system 900 may include an input device 912, such as a keyboard, and a cursor control device 914, such as a mouse or remote control. The computer system 900 can also include a disk drive unit 916, a signal generation device 918, such as a speaker, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable storage medium or equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, MPEG, SMPTE, H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving, at a media playback device, first user input of a selection associated with a particular event from an electronic program guide that displays a schedule of media content available from a content provider via a television system;
   automatically sending a selectable offer to view the particular event in a customized manner in response to a determination by the media playback device that the particular event is associated with multiple input streams;
   receiving, at the media playback device, acceptance of the selectable offer to view the particular event in the customized manner;
   determining, at the media playback device, a category associated with the particular event from metadata of the electronic program guide;
   sending a template list to a display device from the media playback device, wherein each template identified in the template list is associated with the category;
   receiving, at the media playback device, a user selection of a template from the template list;
   receiving, at the media playback device, a user selection of a first video stream and a second video stream, wherein the first video stream and the second video stream are selected from multiple video streams associated with the particular event;
   forming, at the media playback device, an output stream that includes the first video stream and the second video stream; and
   sending the output stream from the media playback device to the display device for playback based on the template, wherein the template indicates a first display region location of the display device where the first video stream is to be displayed, wherein the template indicates a second display region location of the display device where the second video stream is to be displayed, and wherein the first display region location is distinct from the second display region location.

2. The method of claim 1, further comprising:
   receiving an audio stream related to the particular event; and
   synchronizing the first video stream with the audio stream.

3. The method of claim 1, wherein the first display region location is a first user defined region, and wherein the second display region location is a second user defined region.

4. The method of claim 1, wherein the template indicates a third display region location of the display device where stored display content is to be displayed, and wherein the third display region location is distinct from the first display region location and the second display region location.

5. The method of claim 4, wherein the stored display content includes content for a sports team associated with the particular event.

6. The method of claim 4, wherein the stored display content includes an advertisement.

7. The method of claim 1, wherein the first video stream comprises an asynchronous stream that includes information supplemental to the particular event.

8. The method of claim 1, wherein playback of the output stream comprises presenting a first display at the first display region location of the display device, and presenting a second display at the second display region location of the display device.

9. The method of claim 1, wherein the template is selected from a plurality of templates organized in categories based on types of events.

10. The method of claim 1, further comprising receiving the template from an e-commerce store.

11. The method of claim 1, further comprising forming, at the media playback device, a second output stream from the first video stream, and sending the second output stream from the media playback device to a second display device based on the template, wherein the second display device is a different device than the display device.

12. The method of claim 11, further comprising generating a graphical user interface with a selectable control option to switch a first display shown on the display device with a second display shown on the second display device.

13. The method of claim 11, wherein at least one of the display device or the second display device is a display device of a mobile device.

14. The method of claim 1, wherein the template indicates when a portion of the output stream is to be displayed.

15. The method of claim 1, wherein the particular event is includes a football game, and wherein the first video stream includes a video stream of the football game from a first vantage point located at about a 50-yard line position on a first side of a football field.

16. The method of claim 15, wherein the second video stream includes a video stream of the football game from a second vantage point of a mobile camera that is moved to a location adjacent to a position of the football before a play begins.

17. The method of claim 1, wherein the template is modified using an editor.

18. A system, comprising:
a processor;
a scheduler executable by the processor to request a first video stream of a plurality of video streams associated with a particular event and a second video stream of the plurality of video streams;
a production engine executable by the processor to perform operations including:
   determining a category associated with the particular event from metadata received from the scheduler;
   generating a listing of templates associated with the category;
   sending the listing to a display device; and
   receiving a user selection of a template from the listing;
a network interface to receive the first video stream and the second video stream; and
an output interface to generate an output stream to be sent to the display device based on the template, wherein the template indicates a first display region location of the display device where the first video stream is to be displayed, wherein the template indicates a second display region location of the display device where the second video stream is to be displayed, and wherein the first display region location is distinct from the second display region location.

19. The system of claim 18, further comprising a buffer to store at least a portion of the first video stream.

20. The system of claim 18, wherein the first video stream and the second video stream are synchronized by the processor before the output stream is generated by the output interface.

21. The system of claim 18, further comprising an editor to modify the template.

22. A method comprising:
receiving, at a media playback device, first input specifying a first display region location of a display device for a first output stream associated with a particular event;
receiving, at the media playback device, second input specifying a second display region location of the display device for a second output stream associated with the particular event; and
storing information specifying the first display region location and the second display region location in a template via the media playback device, wherein the template is useable by a scheduler of the media playback device to receive a media stream of multiple media streams associated with the particular event a upon receipt of a user selection of the particular event from an electronic program guide and accepts a selectable offer to view the particular event in a customized manner, wherein the selectable offer is automatically sent by the media playback device to the display device in response to a determination by the media playback device that the particular event is associated with multiple input streams, wherein the template is usable by the scheduler to generate the first output stream for display at the first display region location based on a first input stream of the multiple streams, wherein the template is usable by the scheduler to generate the second output stream for display at the second display region location based on a second input stream of the multiple streams, and wherein the first display region location is distinct from the second display region location.

23. The method of claim 22, further comprising selecting a particular media stream to be included in the first output stream from a list of media streams associated with the particular event.

24. The method of claim 22, further comprising selecting the particular event, wherein the template causes generation of a list of media streams associated with the particular event.

25. A computer-readable storage device, comprising executable instructions that, when executed by a processor, cause the processor to perform operations including:
receiving acceptance of an offer to view a particular event in a customized manner, wherein the offer is automatically sent in response to a determination by the processor that the particular event is associated with multiple input streams;
determining a category associated with the particular event;
generating a listing of templates associated with the category;
sending the listing to a display device of a plurality of display devices coupled to the processor;
receiving a user selection of a template from the listing; and
generating an output stream to be displayed on a particular display device of the plurality of display devices based on the template, wherein the template indicates a first display region location of the display device where a first video stream of the multiple input streams is to be displayed, wherein the template indicates a second display region location of the display device where a second video stream of the multiple input streams is to be displayed, and wherein the first display region location is distinct from the second display region location.

* * * * *